March 13, 1962 R. F. McMAHAN, JR 3,025,116
FACE-TO-FACE PLATE TYPE SWIVEL
Filed Sept. 12, 1957 2 Sheets-Sheet 1
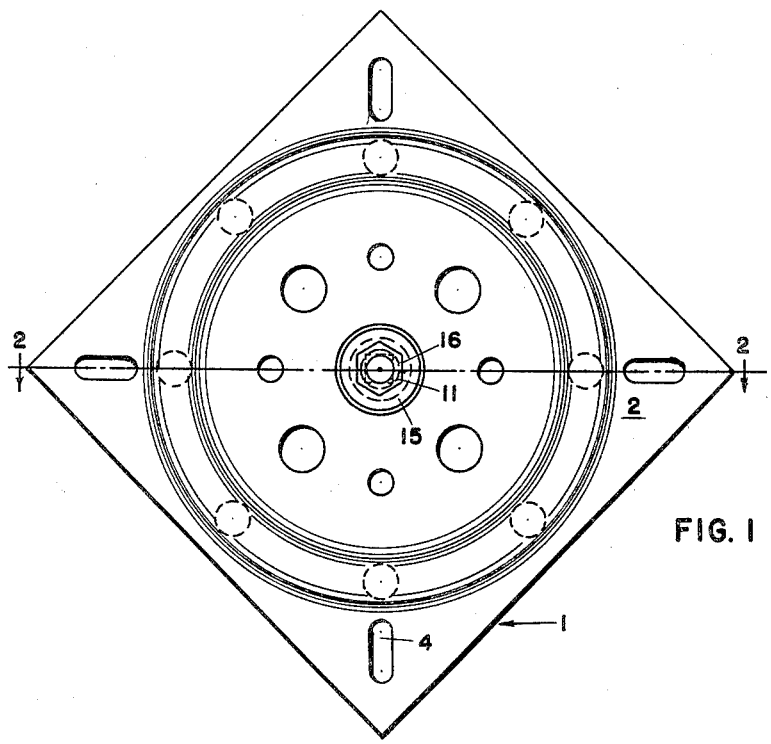
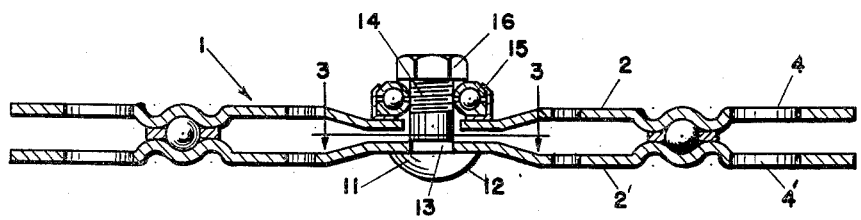
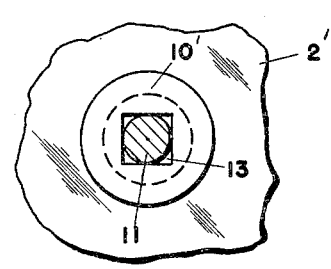
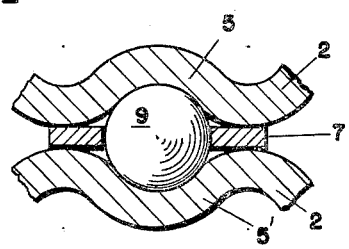
INVENTOR.
ROY F. McMAHAN JR.
BY Arthur W Robert
Atty

United States Patent Office 3,025,116
Patented Mar. 13, 1962

3,025,116
FACE-TO-FACE PLATE TYPE SWIVEL
Roy F. McMahan, Jr., Louisville, Ky., assignor to Middletown Manufacturing Company, Middletown, Ky., a corporation of Kentucky
Filed Sept. 12, 1957, Ser. No. 683,592
6 Claims. (Cl. 308—227)

This invention relates to swivels of the sheet metal plate type conventionally used for interconnecting and rotatably supporting a televison cabinet, chair seat or other like member on a base.

A conventional swivel of this type comprises: upper and lower plates adapted to be attached respectively to a rotatable member and a stationary base; bearing means sandwiched between said plates to facilitate their relative rotation; and a fixedly mounted rivet or shaft extending transversely through the centers of said plates to provide the axis of their relative rotation and to clamp them tightly against said bearing. In any swivel structure, it is desirable to resist the free rotation of the plates enough to require the application of a small force to effect relative rotation and to stop rotation the instant that force is removed. The magnitude of this force is relatively constant in swivels of conventional design. This is objectionable because the magnitude desired varies from one use to another.

The principal object of this invention is to provide a swivel in which the force resisting the relative rotation of the plate may be adjusted to accommodate different uses of the swivel and to compensate for wear in any given use.

This important object may be achieved by adjustably bolting the plates together at their centers with the head end of the bolt keyed to one plate and with a thrust bearing interposed between a nut or member threaded on the other end of the bolt and the other plate. The nut provides an easy means of adjusting the magnitude of the force clamping the yieldable center portions of the plates together and in spaced relationship for resisting relative rotation while the thrust bearing not only tends to prevent the rotation of the nut out of any adjusted position but also to facilitate the relative rotation of the plates. The movement of the nut out of its adjusted position may also be resisted by other conventional means.

Another important object of this invention is to provide a swivel having a ball bearing spacer which not only serves to space ball bearings but also shields them from dust and keeps the swivel in a freely rotatable condition throughout its life.

This object is achieved by using a ring type ball bearing spacer composed of a porous material impregnated or soaked with lubricant. This ring preferably should be thick enough to bridge the space between the plates so as to seal that space against the entry of dirt from the outer side of the bearing assembly and to lubricate the plates also and thereby facilitate optimum operation.

The invention is illustrated in the accompanying drawings wherein:

FIG. 1 is a plan view of one embodiment of the novel swivel construction;

FIG. 2 is a central section taken on lines 2—2 of FIG. 1;

FIG. 3 is a fragmentary section taken on lines 3—3 of FIG. 2;

FIG. 4 is an enlarged fragment of FIG. 2 showing the relation between a bearing ball and its surrounding structure;

Figure 5:
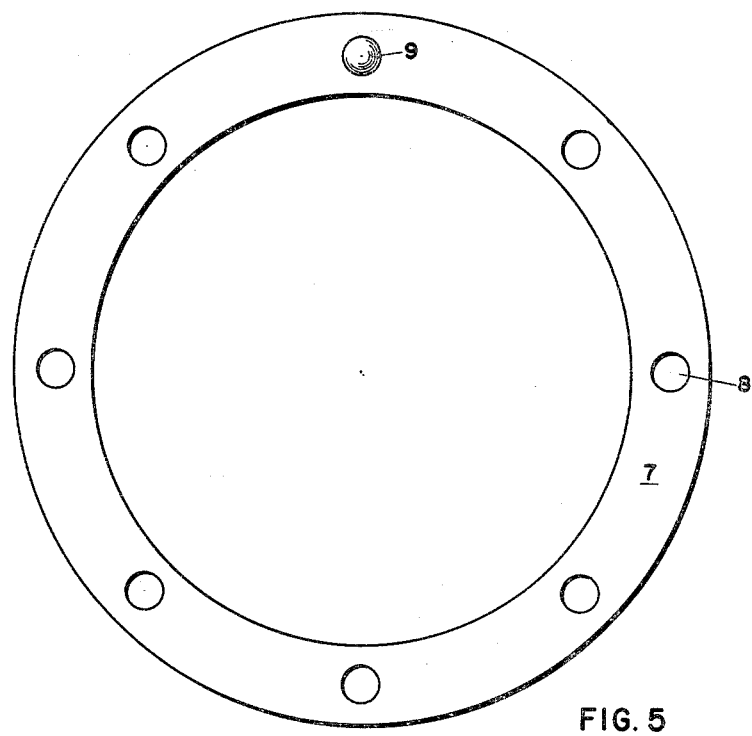
FIG. 5 is a plan view of the ball bearing cage ring used in the novel swivel.

The novel swivel 1 illustrated in FIGS. 1 and 2 comprises an upper swivel plate 2 and a lower swivel plate 2', each of which has respective mounting holes 4 and 4' to receive screws for attaching the respective swivel plates between a rotating member and a cooperating base. Each swivel plate is conventionally composed of sheet metal, which may be readily stamped to shape.

Respective annular grooves 5 and 5' are stamped or otherwise formed in the facing surfaces of the swivel plates 2 and 2' for providing ball bearing raceways. A bearing cage or retainer ring 7 is sandwiched between the raceway grooves 5 and 5' and projects, on both its inner and outer edges, beyond the respective inner and outer margins of the groove. These projecting portions of the cage ring 7 are slidably engaged with the opposite plates 2 and 2' and thereby seal the space between the margins of the opposite raceways to keep dust and dirt from entering the raceways while allowing the opposite swivel plates 2 and 2' and the cage ring 7 to easily rotate relative to each other. The cage ring 7 is perforated with a series of angularly spaced holes 8 arranged around it and extending between its faces. The holes 8 are sized to snugly receive bearing balls 9 as illustrated in FIG. 4 while allowing the balls to rotate freely within their respective holes. The balls 9 have rolling engagement between the upper and lower raceways 5 and 5'. The ball bearing cage ring 7 is made of a substantially rigid and porous material composed of compressed organic fibers such as "Celotex" or "Untempered Masonite" and is well soaked in a suitable lubricating oil before being installed in the swivel. The ball bearing cage 7 keeps the balls 9 properly separated within the raceways, forms a dust seal to prevent dust from entering the raceways, and provides continuous lubrication to the ball bearings 9 as the swivel is used.

The central portions of the upper and lower plates 2 and 2' are dished inwardly toward each other at 10 and 10'. The lower plate 2' is provided with a square hole in its center and the upper plate 2 is provided with a slightly larger round hole at its center.

A carriage bolt 11 extends upwardly through the lower plate 2' and the upper plate 2 with its head 12 abutting the dished portion 10' of the lower plate 2' and the square shoulder portion 13 of its shank adjacent the head 12 fitting into the square hole in the lower plate 2' to lock the bolt 11 against rotation relative to the lower plate. The upper free end of the carriage bolt is provided with a threaded portion 14. An anti-friction thrust bearing 15 is fitted over the bolt downwardly against the central dished portion 10 of the upper plate 2 and a nut 16 is tightened downwardly against the thrust bearing to press the dished center portions of the upper and lower plates 2 and 2' yieldably toward each other, and pinch the outer portion of the plates together on the ball bearings 9 with sufficient force to cause the swivel to offer the desired amount of resistance or drag to rotation. This drag may be adjusted by merely turning the nut 16. Thus, the bolt stem is a stub shaft and the bolt head and its nut constitute a pair of clamping members mounted on opposite ends of the stub shaft and movable relatively toward and away from each other to adjust the force clamping the plates together.

Means is provided to keep the nut 16 from being easily moved from its adjusted position on the bolt by vibration and the normal movements of the swivel. This means may be provided by peening the end of the bolt 11 to slightly expand its threads and make it relatively hard to turn the nut on the bolt.

Figure 6:
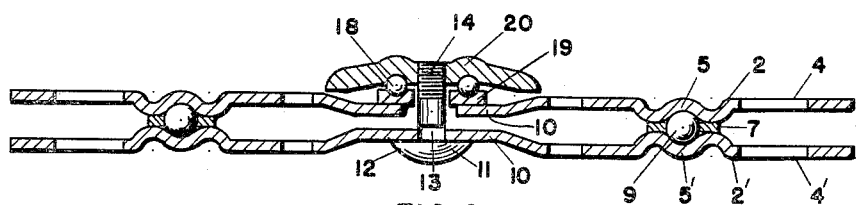
FIG. 6 is a section similar to FIG. 2 of a second embodiment.

The embodiment shown in FIG. 6 contains the same structure as the first embodiment with the exception of the central pivot and adjustable drag means. In this embodiment, the carriage bolt 11 is the same, but the thrust bearing and the nut 16 are replaced by a thrust bearing 18 including ball bearings sandwiched between a lower or inner portion 19 resting against the central portion 10 of the upper plate 2 and an upper or outer portion 20 which is internally threaded at 21 on the threaded end portion 14 of the bolt 11. The drag on the swivel is varied by adjusting the outer portion 20 of the thrust bearing 18 on the bolt 11 to vary the force pinching the plates together. Here again the end of the carriage bolt may be slightly peened to expand and damage its threads and make it relatively hard to turn the outer portion 20 of the thrust bearing on the bolt.

Figure 7:
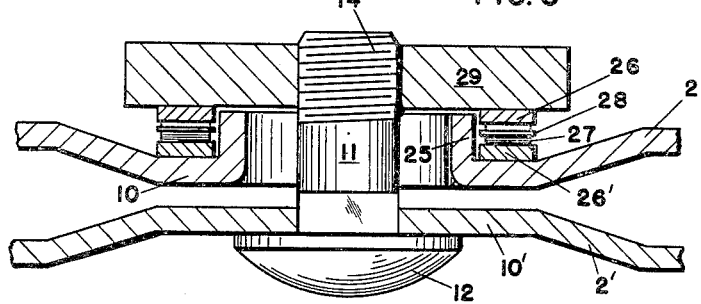
FIG. 7 is a fragmentary elevational section taken through the center of a third embodiment.

The third swivel embodiment illustrated in FIG. 7 is the same as the previously described two embodiments with the exception of its central pivot and adjustable drag structure. In addition to the central dished portion 10 of the upper plate 2 being centrally perforated, the marginal edges of the central hole are turned upwardly to provide a cylindrical flange 25. A roller bearing rests on the central dished portion 10 and around the flange 25 and comprises upper and lower wear resisting washers 26 and 26' sandwiching a series of angularly spaced roller bearings 27 which are kept in place by a retainer ring 28. A large nut 29 is threadably engaged on the threaded end portion 14 of the bolt 11 and is adjusted downwardly against the bearing means to provide the swivel with the desired amount of drag. Here again the end 14 of the bolt 11 may be slightly peened to keep the nut 29 from being freely movable on the bolt.

Having described my invention, I claim:

1. A swivel of the sheet metal plate type commonly employed for rotatably mounting radio cabinets and other household furniture members upon a supporting base, comprising:
A. a pair of sheet metal swivel plates assembled in spaced face-to-face relationship,
   (1) said pair including a member plate and a base plate respectively adapted for firm attachment to said member and said base,
   (2) said spaced plates having
      (a) aligned center holes with a common transversely-extending axis,
      (b) corresponding relatively yieldable concentric center portions located adjacent said center holes, and
      (c) corresponding concentric outer portions located between said center portions and the peripheries of the plates and spaced outwardly a substantial distance from said center portions;
B. outer annular bearing means sandwiched between the concentric outer portions of said spaced plates to facilitate the spacing of said plates and the anti-frictional rotation of one plate relative to the other about said common axis; and
C. centrally disposed means adjustably securing the plates in assembled relationship for relative rotation about said transverse axis, said means including
   (1) a stub shaft extending transversely through the center holes of the plates, and
   (2) a pair of clamping members mounted on opposite ends of the shaft for relative adjusting movement toward and away from each other to clamp the yieldable center portions of the plates in assembled relationship with a clamping pressure which may be adjusted in one direction and the other to increase and decrease the force required to produce relative rotation between the plates,
      (a) one end of said adjustable securing means being connected to one of said plates so as to be held thereby against relative rotational movement,
      (b) the other end of said adjustable securing means including
         (1) an adjustable clamping member threaded to said stub shaft and
         (2) a ball bearing assembly which is interposed between said adjustable clamping member and the outer face of said concentric center portion of the adjacent swivel plate so as to transmit the clamping pressure from said clamping member to said adjacent plate through rolling bearing engagement and thereby facilitate relative rotation therebetween, said bearing assembly including a circular series of ball bearings, an inner bearing race adjacent to but separately fabricated from said adjacent plate and an outer bearing race.

2. The swivel of claim 1 wherein: said outer bearing race of said ball bearing assembly constitutes an integral part of said adjustable clamping member.

3. The swivel of claim 2 wherein: said adjustable clamping member is in the form of a disc; and means is provided to retain said disc on said threaded shaft.

4. The swivel of claim 3 wherein: said plate, which is non-rotatable relative to said shaft, has a squaire opening to receive said stub shaft; and said stub shaft is in the form of a carriage bolt having a square neck which fits non-rotatably within the square opening of said relatively non-rotatable plate.

5. The swivel construction of claim 1 wherein said outer anular bearing means comprises: a pair of ball bearing raceways formed by providing the inner faces of said plates respectively with annular grooves which are aligned with and open toward each other; a ball bearing cage including a flat ring of oil-soaked porous material composed of compressed organic fibers, said cage ring being sandwiched between said raceways and extending beyond the outer and inner edges of said raceways, said cage ring having bearing ball accommodating holes extending between said raceways and arranged at uniform intervals along said ring; and bearing balls fitted in said holes and engaged between said raceways.

6. A swivel construction comprising: a pair of face-to-face swivel plates respectively adapted for connection to a base and a relatively rotatable member and provided on their adjacent inner faces with opposed annular grooves, which cooperate to form a ball bearing raceway; and a ball bearing assembly operatively mounted in said raceway comprising bearing balls spaced along said raceway and a ring type ball bearing spacer composed of porous material permeated with a lubricating oil and sandwiched between raceways, said porous material being composed of compressed organic fibers; said ring bridging the space between said plates to seal the balls and the raceways from dirt and dust.

References Cited in the file of this patent

UNITED STATES PATENTS

| 1,680,446 | Bowen | Aug. 14, 1928 |
| 1,896,698 | Chase | Feb. 8, 1933 |
| 1,982,347 | Large | Nov. 27, 1934 |
| 2,090,960 | Konkle | Aug. 24, 1937 |
| 2,217,259 | Schack | Oct. 8, 1940 |
| 2,234,344 | Hedges | Mar. 11, 1941 |
| 2,468,171 | Carlson | Apr. 26, 1949 |
| 2,569,531 | Kunzog | Oct. 2, 1951 |
| 2,779,642 | Matthews | Jan. 29, 1957 |
| 2,787,804 | Noelting et al. | Apr. 9, 1957 |

FOREIGN PATENTS

| 812,705 | Germany | Sept. 3, 1951 |
| 70,022 | Netherlands | May 15, 1952 |